J. L. DE MOVILLE.
BEVERAGE MACHINE.
APPLICATION FILED DEC. 15, 1914.

1,202,974.

Patented Oct. 31, 1916.
4 SHEETS—SHEET 1.

J. L. DE MOVILLE.
BEVERAGE MACHINE.
APPLICATION FILED DEC. 15, 1914.

1,202,974.

Patented Oct. 31, 1916.
4 SHEETS—SHEET 3.

UNITED STATES PATENT OFFICE.

JAMES L. DE MOVILLE, OF SAN FRANCISCO, CALIFORNIA.

BEVERAGE-MACHINE.

1,202,974.   Specification of Letters Patent.   Patented Oct. 31, 1916.

Application filed December 15, 1914. Serial No. 877,439.

*To all whom it may concern:*

Be it known that I, JAMES L. DE MOVILLE, a citizen of the United States, residing in the city and county of San Francisco and State of California, have invented a new and useful Improvement in Beverage-Machines, of which the following is a specification.

My invention relates to machines for producing lemonade and similar beverages wherein a pair of reciprocating cups, slidably mounted upon the machine, are arranged to retain certain halved fruit, such as oranges, lemons and the like, and to carry the said halved fruit onto a pair of rapidly rotating corrugated crushing heads which remove the juices and pulp from the said fruit, said crushing heads and cups operating in conjunction with means for retaining and mixing the fruit juices with a suitable syrup; and the objects of my invention are first, to provide means adapted to remove the juices, pulp and oil from the fruit; second, to provide means for automatically carrying the cups and the fruit therein onto the rapidly rotating corrugated crushing heads; third, to provide means for automatically removing the rinds or skins from the crushing heads after the juice and pulp have been removed therefrom; fourth, to provide means for automatically removing the skins or rinds from the cups after the same have been removed from the crushing heads to a normal position; fifth, to provide means for separating the seeds from the pulp and juices; sixth, to provide improved means for separating the juice from the pulp; seventh, to provide means for exerting a further pressure on the pulp so as to extract any remaining juices therefrom; eighth, to provide a suitable container wherein the collected juices may be mixed with a suitable syrup; and ninth, to provide mechanical means operating in conjunction with the crushing heads, for thoroughly mixing the juices and syrup. I accomplish these several objects by means of the device disclosed in the drawings forming a part of the present specification wherein like characters of reference are used to designate similar parts throughout the said specification and drawings, and in which—

Referring to the drawings the numeral 1 is used to designate a suitable base having four vertically disposed standards 2 secured thereto, to the upper ends of which in turn is secured a suitable frame 3.

Rotatably mounted on the frame 3 is a central driving shaft 4 having a gear 6 thereon meshing with and driving the gears 7, the purpose of which will hereinafter be more fully described.

Secured to the drive shaft 4 is what I term a grinder 8 within a housing 9 having an aperture 11 in the top thereof through which the fruit is inserted in order to reach the surface of the grinder 8. The shaft 4 extends beyond the grinder 8 and has its end rotatably mounted within a standard 12 secured to the frame 3, said shaft being provided with a threaded portion 14 and covered throughout the said threaded portion thereof by an inverted channel 16 which is rigidly secured between the standards 12 and 17.

Rotatably mounted above the frame 3 and within the standard 17 are parallel shafts 18 to which are secured the gears 7 meshing with the gear 6 secured to the central drive shaft 4. Secured to the ends of the shafts 18 are corrugated crushing heads 19, surrounded by a suitable protective housing 21.

Slidably mounted upon the inverted channel 16 is a sleeve 23 which carries the fruit carrying cups 24. Within each cup 24 is slidably mounted a stem 26 having a shallow cup 27 secured on the inner end thereof, said cups 27, being arranged to conform with the inner surfaces of the cups 24. Pins 28 are inserted within the cups 24 to engage and retain the fruit. A spring 29 is mounted upon each stem 26 between the outer end of the cup 24 and a head 30 on the said stem 26. The heads 30 of the stems 26 are arranged to be normally engaged by the ends 36 of a centrally pivoted lever 31 which is normally held in an engaging position by means of a spring 32 secured to the top of the standard 12. The spring 32 presses downward on one side of the lever 31 thereby causing a lug 33, integral with the lever 31, to engage and normally rest against a stop 34 secured to the top of the standard 12. A suitable coil spring 38 surrounds the threaded portion 14 of the central drive shaft 4 and is interposed between the standard 17 and the rear end of the sleeve 23 which is slidably mounted upon the inverted channel 16, the purpose of which will hereinafter be more fully described.

Figures 8, 10:
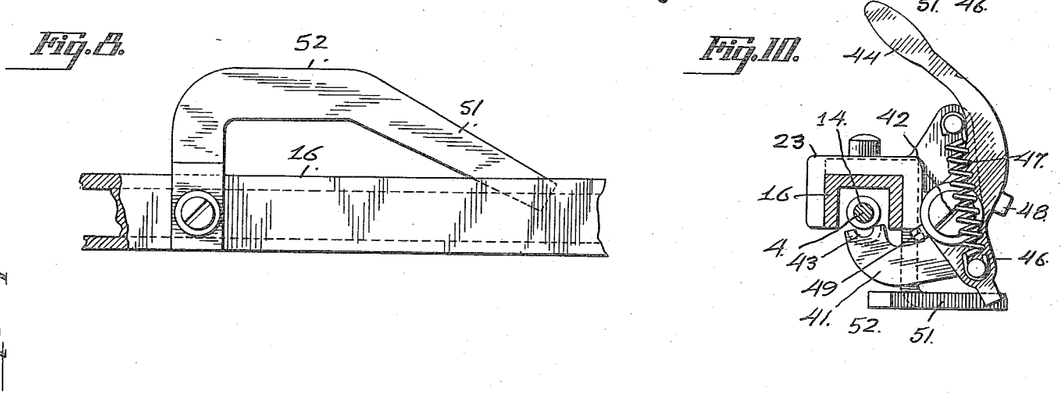
Fig. 8 is a broken plan view of the channel on which the cups are slidably mounted and the trip secured thereto.
Fig. 10 is a view similar to Fig. 9 but with the trip shown released from the driving mechanism for the cups.
Figure 9:
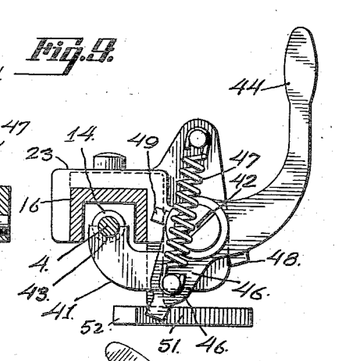
Fig. 9 is a sectional end view of the trip which connects the cups to the driving mechanism therefor, the same being shown in a connected or operating position.

A lever 41 is pivotally secured to the rear end of the sleeve 23 as at 42 and is provided with a concaved semicircular threaded portion 43 adapted to engage the threaded portion 14 of the central drive shaft 4. A lever 44 is also pivotally mounted as at 42 and is provided with an extension 46. A suitable spring 47 has the lower end thereof secured to the lower end of the extension 46 while the upper end of the said spring 47 is secured to the sleeve 23 at a point directly above the center of the pivot 42. In one position the tension of the spring 47 will cause a lug 48 on the lever 44 to engage the lever 41 and cause the threaded portion 43 thereof to engage the threaded portion 14 of the central drive shaft 4 as disclosed in Fig. 9 of the drawings, while the other position of the lever 44 will cause a second lug 49 on the said lever 44 to engage the lever 41 and release and withhold the said lever 44 from engagement with the threaded portion of the central driving shaft 4 as disclosed in Fig. 10 of the drawings. The extension 46 of the lever 44 is engaged and moved to release the lever 41 from engagement with the drive shaft 4 by means of the inclined or slanted surface 51 of a trip 52 secured to the inverted channel 16 which covers the threaded portion 14 of the central drive shaft 4.

The liberated juices, pulp and oil from the fruit drop through a tray 56 having a screen bottom 57, directly below the crushing heads 19 and the grinder 9, and also through a tray 59, having a screen bottom 61, which is supported by a second tray 62 having a solid bottom, said tray 62 being in turn supported by means of a container 63. The screen 57 is composed of a mesh which will retain the seeds of the fruit but will permit the pulp to drop onto the finer screen 61 where it is prevented from piling by a scraper 64 secured to the bottom of a reciprocating frame 66 which is slidably mounted upon the lower or under surface of the frame 3. The reciprocating frame 66 is constantly reciprocated by means of a connecting rod 67 operatively connected thereto and to a crank 68 secured to the lower end of a vertically disposed shaft 69 having a bevel gear 71 on the top thereof which meshes with a bevel gear 72 secured to the central drive shaft 4.

Horizontally disposed gears 76 are driven by means of a suitable gear, not shown, directly under the bevel gear 71 and secured to the shaft 69. Vertically disposed parallel shafts 77 are slidably connected to the gears 76 by means of slots 79 within the said shafts 77, and which engage pins 81 secured to the said gears 76. The gears 76 are retained in place by means of the upper and lower members 86 and 87 respectively while the shafts 77 are free to be lifted by means of the yoke 84 in the ends of which the shafts 77 are rotatably mounted so as to lift the propellers or stirrers 78 when it is desired to remove the container 63.

The tray 62 is provided with a valve 91 having lateral channels 92 therein adapted to register with similar channels 93 in a fixed member 95 secured to the bottom of the tray 62, said channels 92 thereby conveying juice to the central channel 94 of the valve 91. The valve 91 is provided with a lever 96 secured to a horizontally disposed stem 97 slidably mounted within one side of the tray 62 and terminating in a suitable knob 98. The tray 62 is also provided adjacent the valve 91 with a gage glass 99 by means of which the quantity of the juices within the tray 62 may be determined. The container 63 is also provided with a gage glass 100 and a suitable cock 101 by means of which the beverage may be drawn. A container 103 is filled with ice and placed within the container 63 for the purpose of cooling the beverage.

Figure 1:
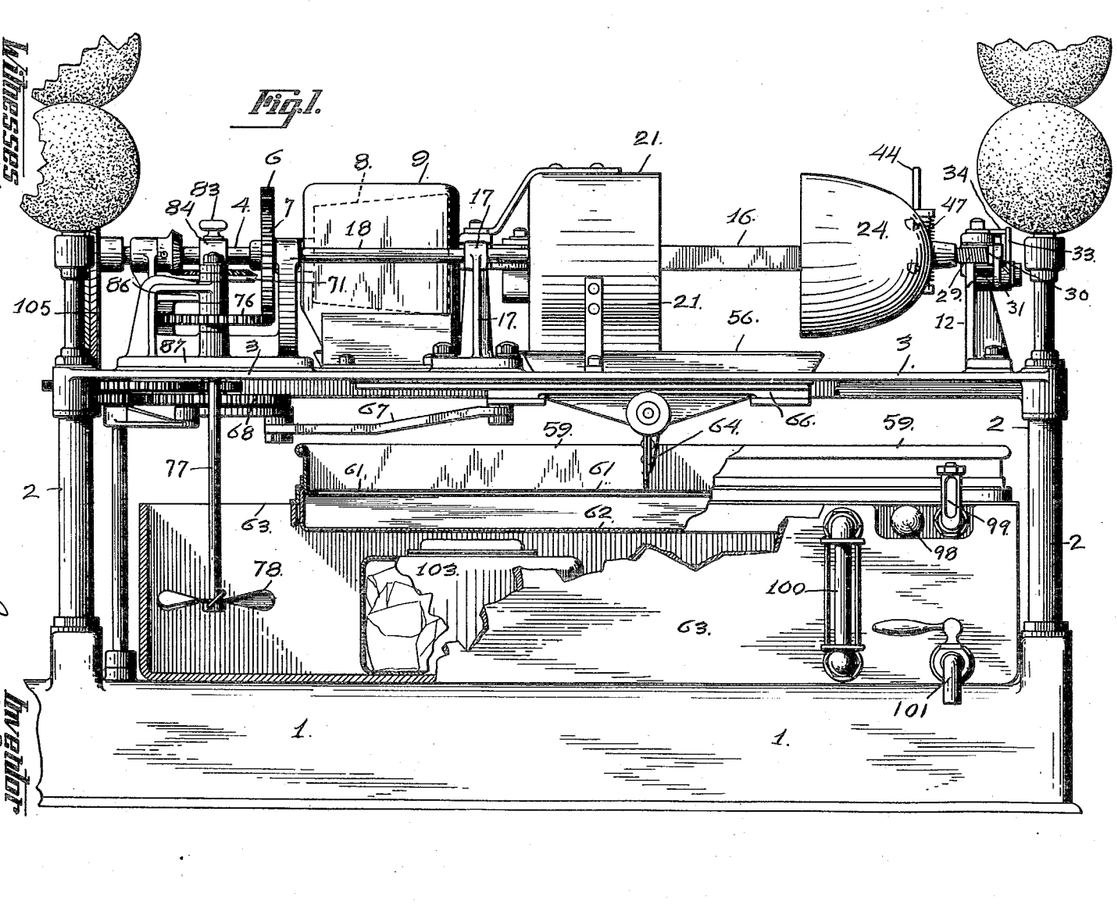
Figure 1 is a broken side elevation of the device disclosing the arrangement of the several parts.
Figure 2:
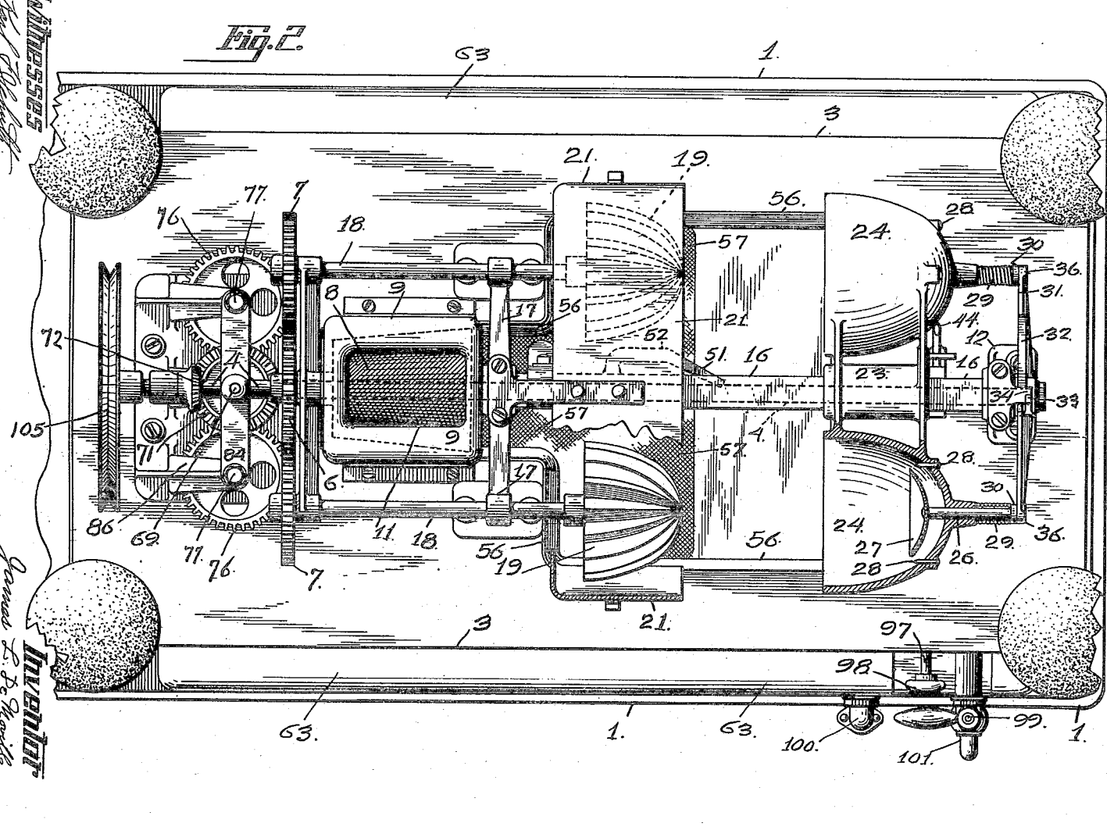
Fig. 2 is a broken plan view partly in section, of Fig. 1.
Figure 3:
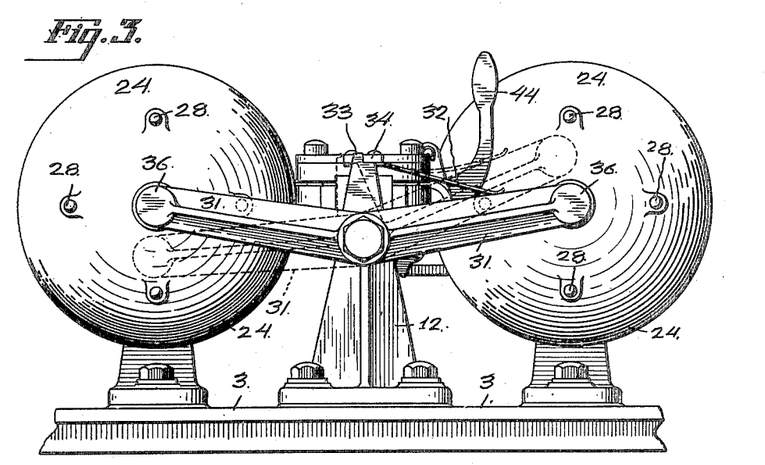
Fig. 3 is an end view on an enlarged scale of the cups which carry the fruit to the crushing heads, the arms which operate to automatically remove the fruit from the cups after crushing, and the lever for connecting the cups with the driving mechanism therefor.
Figures 4, 5, 6:
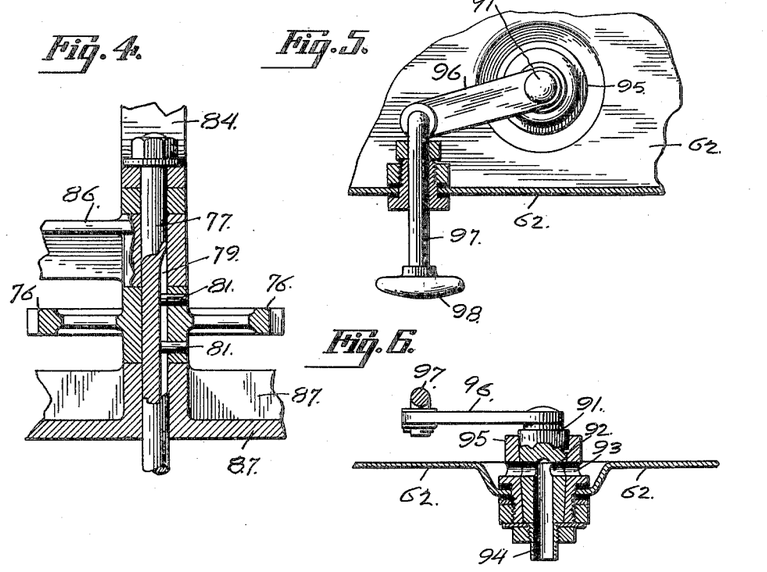
Fig. 4 is a broken sectional view of one of the rotating propeller or stirring shafts disclosing the manner in which the same is slidably connected with the driving gear therefor.
Fig. 5 is a broken plan view of a portion of one of the containers or trays disclosing the valve therein by means of which the juice is released from the said container.
Fig. 6 is a vertical sectional view of the valve shown in Fig. 5.
Figure 7:
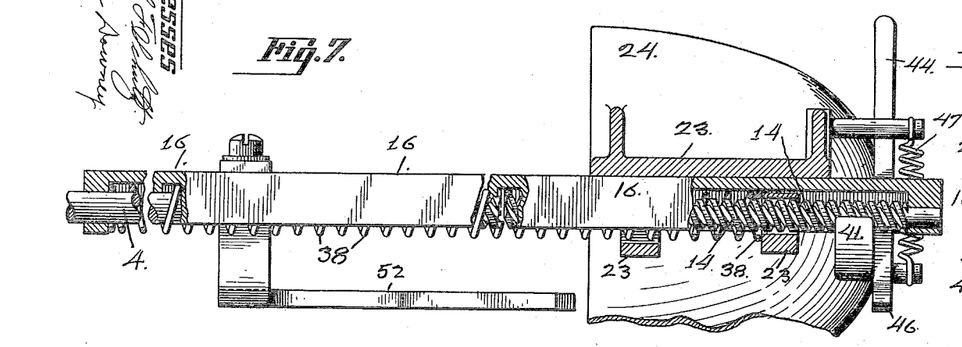
Fig. 7 is a broken sectional view of the driving mechanism for the cups and the trip which releases the said cups from the said driving mechanism.

The operation of the device is as follows:—The cups 24 are normally positioned away from the rapidly rotating crushing heads 19 so that the halved fruit, oranges or lemons, may be easily and readily placed therein. The housing 21 which surrounds the crushing heads 19 will prevent the hands of the operator from coming into contact with the said crushing heads 19. The central drive shaft 4 is constantly rotated by means of any suitable motor operatively connected to the driving sheave 105 secured to the end of the said shaft 4. The lever 31 is depressed against the tension of the spring 32 to the position indicated in dotted lines in Fig. 3 of the drawings which will remove the ends 36 thereof from behind the heads 30 of the stems 26 thereby allowing the springs 29 to move the shallow cups 27 against the inner surface of the cups 24. When the lever 31 is released the tension of the spring 32 will return the ends 36 thereof against the stems 26 and the springs 29 thereon until the sleeve 23 and the cups 24 are moved forward as hereinafter described when the tension of the said spring 32 will return the lever 31 to normal position. The lemons or oranges to be used are cut in half and the said halves are inserted into the cups 24 and onto the pins 28 therein, said pins being provided for the purpose of preventing the fruit from turning when engaged by the rotating crushing heads 19 and also for the purpose of retaining the fruit within the cups 24. By moving the lever 44 to the position indicated in Fig. 9 of the drawings, the lug 48 thereon will engage the lever 41 and move the threaded portion 43 thereof into engagement with the threaded portion 14 of the central drive shaft 4. The lever 41 will be retained in engagement with the threaded portion 14 of the drive shaft 4 by means of the spring 47 which has been moved to that side of the pivot 42 of the lever 41 which will cause the tension of the said spring 47 to act on the said lever 41 in a direction which will retain its engagement with the threaded portion 14 of the shaft 4 as hereinabove described. As the lever 41, which is pivotally secured to the sleeve 23, engaged the rotating threaded portion 14 of the shaft 4, the cups 24, on the said sleeve 23, containing the fruit will be carried against the tension of the spring 38 to a position where the rotating crushing heads 19 will engage the fruit within the cups 24 and remove the pulp and juice therefrom, the said pulp and juice falling through the coarse screen 57 of the tray 56 onto the finer screen 61 of the tray 59, until the extension 46 of the lever 44 is engaged by the inclined portion 51 of the trip 52 when the said trip 52 will move the extension 46 and the lever 44 to the position indicated in Fig. 10 of the drawings. This will move the spring 47 to the opposite side of the pivot 42 and the tension of the said spring 47 will then release and disengage the lever 41 from the threaded portion 14 of the central drive shaft 4 and the tension of the spring 38 will automatically move the sleeve 23 and the cups 24 thereon, containing the shell or rind of the fruit, backward to a normal position until the heads 30 of the stems 26 engage the ends 36 of the lever 31. As the tension of the spring 38 is greater than the combined tensions of the springs 29 on the stems 26 it is obvious that the return movement of the said stems 26, and the shallow cups 27 thereon, will be arrested before the cups 24 are brought to a stop. This will cause a movement of the stems 26 and cups 27 thereon relatively to the cups 24 which movement will remove the skins or rinds from the pins 28. The tension of the springs 29 will also tend to absorb the shock and resiliently cushion the movement of the sleeve 23 and the cups 24 thereon and bring the said sleeve 23 and cups 24 thereon easily to a state of rest. The rinds of the fruit may be easily removed from the cups 24 and inserted through the aperture 11 of the housing 9 until the said rinds are in contact with the rotating grinder 8 which disintegrates the skin or rind and liberates sufficient oil therefrom to impart a flavor to the beverage. As the pulp is deposited upon the screen 61 the scraper 64, secured to the reciprocating frame 66, is reciprocated and the pulp is not only prevented from piling up but is further subjected to a gentle pressure which will tend to remove any remaining juices. A syrup composed of a mixture of water and sugar is deposited within the container 63, the proper amount being determined by the gage glass 100. As soon as the gage glass 99 of the tray 62 shows that the required proportion of juices for the amount of syrup has been obtained the knob 98 is pushed inward which will cause the channels 92 to register with the channels 93 and the juice will run into the container 63 where it will be thoroughly stirred and mixed by means of the rotating propellers or stirrers 78, the said stirrers 78 being constantly rotated by means of the gears 76 as hereinbefore described. When it is desired to remove the container 63 for cleansing purposes, the propellers or stirrers 78 are lifted clear of the top of the said container 63 by means of the yoke 84 as hereinbefore described.

It is obvious from the foregoing that I have provided improved means for removing the pulp and juice from lemons, oranges and similar fruit and also improved means for automatically removing the rinds or skins from the cups after the juice and pulp has been extracted therefrom. It is also evident that I have provided improved means for separating the seeds of the fruit from the juices and pulp, and also for thoroughly mixing the juices with the syrup in the container and cooling the same.

The details of construction are so susceptible to variation that I do not wish to confine myself to the precise construction shown and described herein, but rather to avail myself of any modification that may fall properly within the scope of my invention.

Having thus described my invention what I claim as new and desire to secure by Letters Patent is—

1. A beverage machine comprising a pair of rotating corrugated crushing heads; a pair of reciprocating cups normally positioned away from the crushing heads and adapted to engage and retain certain halved fruit therein; pins secured within the cups and adapted to engage and prevent the rotation of the halved fruit therein; a threaded rotating shaft operatively connected with the crushing heads; means operatively connected to the cups and adapted to be engaged by the rotating shaft and thereby carry the cups and the fruit therein onto the rotating crushing heads and removing the juice and pulp from the said fruit; a suitable trip adapted to disengage the cups from the threaded rotating shaft when the juice and pulp shall have been removed from the fruit within the said cups; and means for automatically returning the cups from the crushing heads to a normal position after the juice and pulp shall have been removed from the fruit.

2. A beverage machine comprising a pair of rotating corrugated crushing heads; a pair of reciprocating cups normally positioned away from the crushing heads and adapted to engage and retain certain halved fruit therein; pins secured within the cups and adapted to engage and prevent the rotation of the halved fruit therein; a threaded rotating shaft operatively connected with the crushing heads; means operatively connected to the cups and adapted to be engaged by the rotating shaft and thereby carry the cups and the fruit therein onto the rotating crushing heads and removing the juice and pulp from the said fruit; a suitable trip adapted to disengage the cups from the threaded rotating shaft when the juice and pulp shall have been removed from the fruit within the said cups; means for automatically returning the cups from the crushing heads to a normal position after the juice and pulp shall have been removed from the fruit; and means for automatically removing the rinds or skins from the cups when the same are returned to a normal position.

3. A beverage machine comprising a pair of rotating corrugated crushing heads; a pair of reciprocating cups normally positioned away from the crushing heads and adapted to engage and retain certain halved fruit therein; pins secured within the cups and adapted to engage and prevent the rotation of the halved fruit therein; a threaded rotating shaft operatively connected with the crushing heads; means operatively connected to the cups and adapted to be engaged by the rotating shaft and thereby carry the cups and the fruit therein onto the rotating crushing heads and removing the juice and pulp from the said fruit; a suitable trip adapted to disengage the cups from the threaded rotating shaft when the juice and pulp shall have been removed from the fruit within the said cups; means for automatically returning the cups from the crushing heads to a normal position after the juice and pulp shall have been removed from the fruit; means for automatically removing the rinds or skins from the cups when the same are returned to a normal position; and means arranged to collect and retain the pulp and juices removed from the fruit.

4. In a beverage machine, the combination of a suitable base; a frame arranged above the base; a central drive shaft having a threaded portion thereon rotatably mounted within the frame; a pair of corrugated rotating crushing heads operatively connected to the central drive shaft; a pair of cups slidably mounted upon the frame and positioned away from the crushing heads and arranged to retain certain halved fruit; pins secured within the cups and adapted to engage and prevent the rotation of the fruit; means operatively connected to the cups and adapted to engage the threaded portion of the drive shaft and to carry the cups and the fruit therein onto the crushing heads thereby removing the juice and pulp from the said fruit; a suitable trip adapted to disengage the cups from the threaded portion of the shaft when the juice and pulp shall have been removed from the fruit therein; and means adapted to automatically return the cups and the fruit therein to a normal position away from the crushing heads when the juice and pulp shall have been removed from the fruit.

5. In a beverage machine, the combination of a suitable base; a frame arranged above the base; a central drive shaft having a threaded portion thereon rotatably mounted within the frame; a pair of corrugated rotating crushing heads operatively connected to the central drive shaft; a pair of cups slidably mounted upon the frame and positioned away from the crushing heads and arranged to retain certain halved fruit; pins secured within the cups and adapted to engage and prevent the rotation of the fruit; means operatively connected to the cups and adapted to engage the threaded portion of the drive shaft and to carry the cups and the fruit therein onto the crushing heads thereby removing the juice and pulp from the said fruit; a suitable trip adapted to disengage the cups from the threaded portion of the shaft when the juice and pulp shall have been removed from the fruit therein; means adapted to automatically return the cups and the fruit therein to a normal position away from the crushing heads when the juice and pulp shall have been removed from the fruit; and means arranged to automatically remove the rinds or skins from the cups when the said cups shall have been returned to a normal position.

6. In a beverage machine, the combination of a suitable base; a frame arranged above the base; a central drive shaft having a threaded portion thereon rotatably mounted within the frame; a pair of corrugated rotating crushing heads operatively connected to the central drive shaft; a pair of cups slidably mounted upon the frame and positioned away from the crushing heads and arranged to retain certain halved fruit; pins secured within the cups and adapted to engage and prevent the rotation of the fruit; means operatively connected to the cups and adapted to engage the threaded portion of the drive shaft and to carry the cups and the fruit therein onto the crushing heads thereby removing the juice and pulp from the said fruit; a suitable trip adapted to disengage the cups from the threaded portion of the shaft when the juice and pulp shall have been removed from the fruit therein; means adapted to automatically return the cups and the fruit therein to a normal position away from the crushing heads when the juice and pulp shall have been removed from the fruit; and means arranged to collect and retain the juice and pulp from the fruit.

7. In a beverage machine, the combination of a suitable base; a frame arranged above the base; a central drive shaft having a threaded portion thereon rotatably mounted within the frame; a pair of corrugated rotating crushing heads operatively connected to the central drive shaft; a pair of cups slidably mounted upon the frame and positioned away from the crushing heads and arranged to retain certain halved fruit; pins secured within the cups and adapted to engage and prevent the rotation of the fruit; means operatively connected to the cups and adapted to engage the threaded portion of the drive shaft and to carry the cups and the fruit therein onto the crushing heads thereby removing the juice and pulp from the said fruit; a suitable trip adapted to disengage the cups from the threaded portion of the shaft when the juice and pulp shall have been removed from the fruit therein; means adapted to automatically return the cups and the fruit therein to a normal position away from the crushing heads when the juice and pulp shall have been removed from the fruit; means arranged to automatically remove the rinds or skins from the cups when the said cups have been returned to a normal position; and a suitable tray arranged to collect and retain the seeds from the fruit and to allow the passage of the juice and pulp.

8. In a beverage machine, the combination of a suitable base; a frame arranged above the base; a central drive shaft having a threaded portion thereon rotatably mounted within the frame; a pair of corrugated rotating crushing heads operatively connected to the central drive shaft; a pair of cups slidably mounted upon the frame and positioned away from the crushing heads and arranged to retain certain halved fruit; pins secured within the cups and adapted to engage and prevent the rotation of the fruit; means operatively connected to the cups and adapted to engage the threaded portion of the drive shaft and to carry the cups and the fruit therein onto the crushing heads thereby removing the juice and pulp from the said fruit; a suitable trip adapted to disengage the cups from the threaded portion of the shaft when the juice and pulp shall have been removed from the fruit therein; means adapted to automatically return the cups and the fruit therein to a normal position away from the crushing heads when the juice and pulp shall have been removed from the fruit; means arranged to automatically remove the rinds or skins from the cups when the said cups have been returned to a normal position; a suitable tray arranged to collect and retain the seeds from the fruit and to allow the passage of the juice and pulp; and a second tray arranged below the first mentioned tray and arranged to separate the juice from the pulp.

9. In a beverage machine, the combination of a suitable base; a frame arranged above the base; a central drive shaft having a threaded portion thereon rotatably mounted within the frame; a pair of corrugated rotating crushing heads operatively connected to the central drive shaft; a pair of cups slidably mounted upon the frame and positioned away from the crushing heads and arranged to retain certain halved fruit; pins secured within the cups and adapted to engage and prevent the rotation of the fruit; means operatively connected to the cups and adapted to engage the threaded portion of the drive shaft and to carry the cups and the fruit therein onto the crushing heads thereby removing the juice and pulp from the said fruit; a suitable trip adapted to disengage the cups from the threaded portion of the shaft when the juice and pulp shall have been removed from the fruit therein; means adapted to automatically return the cups and the fruit therein to a normal position away from the crushing heads when the juice and pulp shall have been removed from the fruit; means arranged to automatically remove the rinds or skins from the cups when the said cups have been returned to a normal position; a suitable tray arranged to collect and retain the seeds from the fruit and to allow the passage of the juice and pulp; and a second tray arranged below the first mentioned tray and having a screen therein arranged to retain the pulp above the juice in the bottom thereof.

10. In a beverage machine, the combination of a suitable base; a frame arranged above the base; a central drive shaft having a threaded portion thereon rotatably mounted within the frame; a pair of corrugated rotating crushing heads operatively connected to the central drive shaft; a pair of cups slidably mounted upon the frame and positioned away from the crushing heads and arranged to retain certain halved fruit; pins secured within the cups and adapted to engage and prevent the rotation of the fruit; means operatively connected to the cups and adapted to engage the threaded portion of the drive shaft and to carry the cups and the fruit therein onto the crushing heads thereby removing the juice and pulp from the said fruit; a suitable trip adapted to disengage the cups from the threaded portion of the shaft when the juice and pulp shall have been removed from the fruit therein; means adapted to automatically return the cups and the fruit therein to a normal position away from the crushing heads when the juice and pulp shall have been removed from the fruit; means arranged to automatically remove the rinds or skins from the cups when the said cups have been returned to a normal position; a suitable tray arranged to collect and retain the seeds from the fruit and to allow the passage of the juice and pulp; a second tray arranged below the first mentioned tray and having a screen therein arranged to retain the pulp above the juice in the bottom thereof; and means operatively connected to the central drive shaft and arranged to exert a further pressure on the pulp and to prevent the same from piling upon the screen in the second mentioned tray.

11. In a beverage machine, the combination of a suitable base; a frame arranged above the base; a central drive shaft having a threaded portion thereon rotatably mounted within the frame; a pair of corrugated rotating crushing heads operatively connected to the central drive shaft; a pair of cups slidably mounted upon the frame and positioned away from the crushing heads and arranged to retain certain halved fruit; pins secured within the cups and adapted to engage and prevent the rotation of the fruit; means operatively connected to the cups and adapted to engage the threaded portion of the drive shaft and to carry the cups and the fruit therein onto the crushing heads thereby removing the juice and pulp from the said fruit; a suitable trip adapted to disengage the cups from the threaded portion of the shaft when the juice and pulp shall have been removed from the fruit therein; means adapted to automatically return the cups and the fruit therein to a normal position away from the crushing heads when the juice and pulp shall have been removed from the fruit; means arranged to automatically remove the rinds or skins from the cups when the said cups shall have been returned to a normal position; a suitable tray arranged to collect and retain the seeds from the fruit and to allow the passage of the juice and pulp; a second tray arranged below the first mentioned tray and having a screen therein arranged to retain the pulp above the juice in the bottom thereof; and a reciprocating member slidably mounted upon the under side of the frame and arranged to exert a further pressure on the pulp and to prevent the same from piling in the second mentioned tray.

12. In a beverage machine, the combination of a suitable base; a frame arranged above the base; a central drive shaft having a threaded portion thereon rotatably mounted within the frame; a pair of corrugated rotating crushing heads operatively connected to the central drive shaft; a pair of cups slidably mounted upon the frame and positioned away from the crushing heads and arranged to retain certain halved fruit; pins secured within the cups and adapted to engage and prevent the rotation of the fruit; means operatively connected to the cups and adapted to engage the threaded portion of the drive shaft and to carry the cups and the fruit therein onto the crushing heads thereby removing the juice and pulp from the said fruit; a suitable trip adapted to disengage the cups from the threaded portion of the shaft when the juice and pulp shall have been removed from the fruit therein; means adapted to automatically return the cups and the fruit therein to a normal position away from the crushing heads when the juice and pulp shall have been removed from the fruit; means arranged to automatically remove the rinds or skins from the cups when the said cups have been returned to a normal position; a suitable tray arranged to collect and return the seeds from the fruit and to allow the passage of the juice and pulp; a second tray arranged below the first mentioned tray and having a screen therein arranged to retain the pulp above the juice in the bottom thereof; a reciprocating member slidably mounted upon the under side of the frame and arranged to exert a further pressure on the pulp and to prevent the same from piling in the second mentioned tray; and a container arranged on the base and below the frame and adapted to support the second mentioned tray and to receive and retain the juice from the fruit.

In witness whereof I hereunto set my signature in the presence of two subscribing witnesses.

JAMES L. DE MOVILLE.

Witnesses:
FLORENCE CLEMENS,
JAMES F. McCUE.